(12) United States Patent
Pan

(10) Patent No.: US 7,539,158 B2
(45) Date of Patent: May 26, 2009

(54) SYSTEM, METHOD AND DEVICE FOR PROVIDING COMMUNICATIONS USING A DISTRIBUTED MOBILE ARCHITECTURE

(75) Inventor: Shaowei Pan, Kildeer, IL (US)

(73) Assignee: Lemko Corporation, Shaumburg, IL (US)

( * ) Notice: Subject to any disclaimer, the term of this patent is extended or adjusted under 35 U.S.C. 154(b) by 846 days.

(21) Appl. No.: 10/983,516

(22) Filed: Nov. 8, 2004

(65) Prior Publication Data

US 2006/0098661 A1 May 11, 2006

(51) Int. Cl.
*H04W 4/00* (2006.01)

(52) U.S. Cl. .................... 370/328; 370/338; 370/465; 455/560

(58) Field of Classification Search ............. None
See application file for complete search history.

(56) References Cited

U.S. PATENT DOCUMENTS

| | | | |
|---|---|---|---|
| 5,623,495 A | 4/1997 | Eng et al. | |
| 6,122,499 A | 9/2000 | Magnusson | |
| 6,141,564 A | 10/2000 | Bruner et al. | |
| H1918 H | 11/2000 | Hoffpauir et al. | |
| 6,411,825 B1 | 6/2002 | Csapo et al. | |
| 6,421,325 B1 | 7/2002 | Kikinis | |
| 6,515,985 B2 | 2/2003 | Shmulevich et al. | |
| 6,539,237 B1 | 3/2003 | Sayers et al. | |
| 6,584,098 B1 | 6/2003 | Dutnall | |
| 6,611,533 B1 | 8/2003 | Liao et al. | |
| 6,614,784 B1 | 9/2003 | Glitho et al. | |
| 6,647,426 B2 | 11/2003 | Mohammed | |
| 6,678,155 B1 | 1/2004 | Bresniker et al. | |
| 6,694,134 B1 | 2/2004 | Lu et al. | |
| 6,704,409 B1 * | 3/2004 | Dilip et al. | 379/265.02 |
| 6,751,207 B1 | 6/2004 | Lee et al. | |
| 6,760,325 B1 | 7/2004 | Hameleers et al. | |
| 6,763,226 B1 | 7/2004 | McZeal, Jr. | |
| 6,763,233 B2 | 7/2004 | Bharatia | |
| 6,791,988 B1 | 9/2004 | Hameleers et al. | |
| 6,795,444 B1 | 9/2004 | Vo et al. | |
| 6,807,431 B2 | 10/2004 | Sayers et al. | |
| 6,807,432 B2 | 10/2004 | Sayers et al. | |
| 6,819,652 B1 | 11/2004 | Akhtar et al. | |

(Continued)

FOREIGN PATENT DOCUMENTS

EP 0 365 885 5/1990

OTHER PUBLICATIONS

Pan, U.S. Appl. No. 12/146,618, entitled System and Method to Control Wireless Communications, filed Jun. 26, 2008.

(Continued)

*Primary Examiner*—Michael J Moore, Jr.
(74) *Attorney, Agent, or Firm*—Jeffrey G. Toler; Toler Law Group

(57) ABSTRACT

A communications system includes one or more distributed mobile architecture servers. Each distributed mobile architecture servers includes a compute readable medium. Moreover, a mobile switching center module and a base station controller module are embedded in the computer readable medium. Each distributed mobile architecture server is in direction physical connection with a wireless transceiver. Telephony traffic received from the wireless transceiver can be switched by one or more distributed mobile architecture servers. Also, the telephony traffic can be transmitted between the distributed mobile architecture servers via a peer-to-peer connection.

15 Claims, 16 Drawing Sheets

U.S. PATENT DOCUMENTS

| | | | |
|---|---|---|---|
| 6,831,903 | B2 | 12/2004 | Kang |
| 6,839,356 | B2 | 1/2005 | Barany et al. |
| 6,859,652 | B2 | 2/2005 | Karabinis et al. |
| 6,879,582 | B1 | 4/2005 | Dhara et al. |
| 6,879,677 | B2 | 4/2005 | Trandal et al. |
| 6,917,813 | B2 | 7/2005 | Elizondo |
| 7,050,414 | B2 | 5/2006 | Lin |
| 7,072,650 | B2 | 7/2006 | Stanforth |
| 7,120,435 | B2 * | 10/2006 | Usher et al. ............... 455/431 |
| 7,313,399 | B2 | 12/2007 | Rhee et al. |
| 7,324,478 | B2 * | 1/2008 | Park et al. ............... 370/331 |
| 7,349,412 | B1 * | 3/2008 | Jones et al. ............... 370/401 |
| 2001/0036173 | A1 | 11/2001 | Shmulevich et al. |
| 2001/0046859 | A1 * | 11/2001 | Kil ............... 455/426 |
| 2001/0055298 | A1 | 12/2001 | Baker et al. |
| 2002/0015392 | A1 | 2/2002 | Musikka et al. |
| 2002/0045444 | A1 | 4/2002 | Usher et al. |
| 2002/0058502 | A1 | 5/2002 | Stanforth |
| 2002/0169887 | A1 | 11/2002 | MeLampy et al. |
| 2003/0063721 | A1 | 4/2003 | Hirose |
| 2003/0100342 | A1 | 5/2003 | Ham et al. |
| 2003/0153343 | A1 | 8/2003 | Crockett et al. |
| 2003/0198325 | A1 | 10/2003 | Bayne |
| 2004/0014466 | A1 | 1/2004 | Jesse et al. |
| 2004/0018829 | A1 | 1/2004 | Raman et al. |
| 2004/0019539 | A1 | 1/2004 | Raman et al. |
| 2004/0156495 | A1 | 8/2004 | Chava et al. |
| 2004/0204097 | A1 | 10/2004 | Scheinert et al. |
| 2004/0253949 | A1 | 12/2004 | Swensen et al. |
| 2004/0259556 | A1 | 12/2004 | Czys |
| 2005/0176413 | A1 | 8/2005 | Lee et al. |
| 2006/0046760 | A1 | 3/2006 | Bertino et al. |
| 2006/0203746 | A1 | 9/2006 | Maggenti et al. |
| 2006/0234747 | A1 | 10/2006 | Pan |
| 2006/0234774 | A1 | 10/2006 | Pan et al. |
| 2007/0202847 | A1 | 8/2007 | Pan |
| 2007/0232267 | A1 | 10/2007 | Pan |
| 2007/0287452 | A1 | 12/2007 | Pan |
| 2008/0039144 | A1 | 2/2008 | Pan et al. |
| 2008/0146158 | A1 | 6/2008 | Pan et al. |

OTHER PUBLICATIONS

Pan, U.S. Appl. No. 12/108,209, entitled System and Method to Control Wireless Communications, filed Apr. 23, 2008.

Pan, U.S. Appl. No. 12/163,601, entitled Fault Tolerant Distributed Mobile Architecture, filed Jun. 27, 2008.

Pan, U.S. Appl. No. 12/171,840, entitled OAMP for Distributed Mobile Architecture, filed Jul. 11, 2008.

Pan, U.S. Appl. No. 12/172,639, entitled System, Method, and Device for Routing Calls Using a Distributed Mobile Architecture, filed Jul. 11, 2008.

Pan, U.S. Appl. No. 12/238,269, entitled Multiple IMSI Connections, filed Sep. 25, 2008.

* cited by examiner

SYSTEM, METHOD AND DEVICE FOR PROVIDING COMMUNICATIONS USING A DISTRIBUTED MOBILE ARCHITECTURE

FIELD OF THE DISCLOSURE

The present disclosure relates generally to the distributed mobile communication systems.

BACKGROUND

Access to basic telephony service is particularly important for rural and isolated communities. Telephony access allows small-scale enterprises, cooperatives, and farmers to obtain accurate information on fair prices for their products and to access regional and national markets. Access also reduces the cost of transportation and supports the local tourist industry. By bringing markets to people via telecommunications, rather than forcing people to leave in search of markets, urban migration is reduced and greater income and employment potential are generated in rural areas.

Unfortunately, the last decade of the telecommunications boom has not alleviated the disparities between urban and rural communities. The average imbalance, in terms of telephone penetration, in Asia, for example, is over ten to one and is often as high as twenty to 1.2. This means that a country whose urban markets have a penetration of four (4) telephone lines per one-hundred (100) inhabitants, e.g., India and Pakistan, has a rural penetration of less than 0.2 per one-hundred (100). The situation is more acute in most African countries and in some parts of Latin America. By comparison, the disparity in average income level between urban and rural residents in the developing world is usually less than 4 to 1.

Current telephone systems are expensive to deploy. For example, a typical cellular system that includes a mobile switching center (MSC), a base station controller (BSC), and a home location register/visitor location register (HLR/VLR) can cost over $2.0 million. Moreover, such a system requires a minimum of ten thousand users in order to be economically viable. In many rural areas, the population is not large enough to support the installation of such a system. Further, in many cases, the conditions in which the equipment, e.g., the MSC, BSC, and HLR/VLR, are to be operated are extremely harsh and environmentally prohibitive. An alternative to such a cellular system can include a wired system, but the costs associated with deploying and maintaining land lines are too high for certain rural areas.

Accordingly, there exists a need for an improved communications system that is relatively inexpensive to deploy and relatively inexpensive to operate.

BRIEF DESCRIPTION OF THE DRAWINGS

The present invention is pointed out with particularity in the appended claims. However, other features are described in the following detailed description in conjunction with the accompanying drawings in which:

DETAILED DESCRIPTION OF THE DRAWINGS

Figure 1:
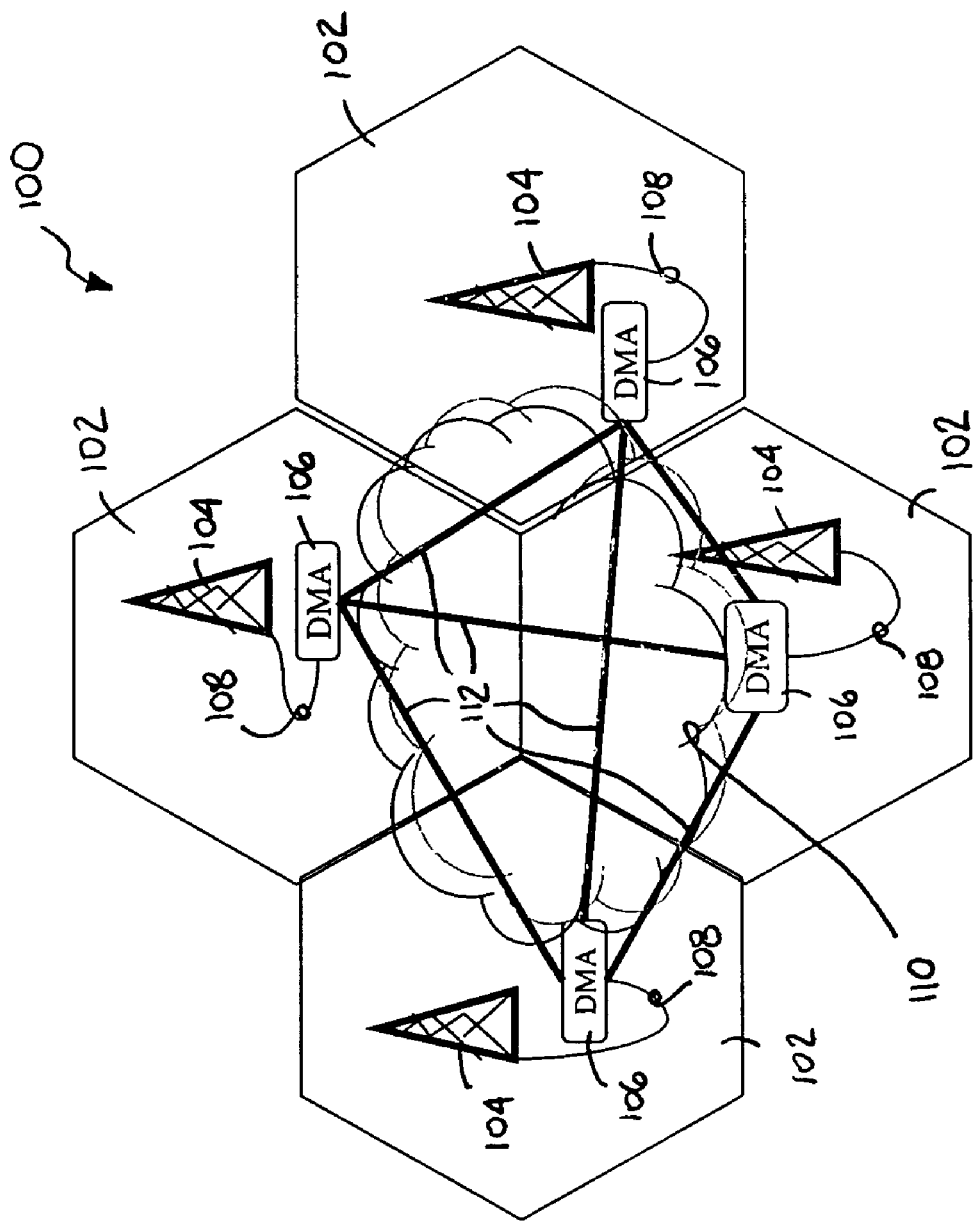
FIG. 1 is a diagram of a distributed and associative communication system.

A communications system includes one or more distributed mobile architecture servers. Each of the one or more distributed mobile architecture servers includes a compute readable medium and a mobile switching center module and a base station controller module are embedded in the computer readable medium. Each of the one or more distributed mobile architecture servers is in direct physical connection with a wireless transceiver. Telephony traffic received from the wireless transceiver is switched by at least one of the distributed mobile architecture servers.

In an embodiment, telephony traffic can be transmitted between the plurality of distributed mobile architecture servers via peer-to-peer connections. Also, the plurality of the distributed mobile architecture servers can control radio resources associated with the wireless transceiver coupled thereto. Further, the distributed mobile architecture server can include administrative information corresponding to one or more wireless telephone device subscribers and the administrative information can be stored on the computer readable medium.

In an embodiment, the distributed management architecture server includes a gateway to a public switched telephone network, a media gateway, a packet data server node gateway, a simple Internet phone gateway, and a signaling system seven (SS7) gateway. Moreover, the mobile switching center module can include an authentication, authorization, and accounting module. The mobile switching center module further includes a gatekeeper module that is coupled to the public switched telephone network gateway, the media gateway, the packet data server node gateway, the simple internet phone gateway, and the authentication, authorization, and accounting module.

In an embodiment, the base station controller module includes a cellular radio network controller, a cellular selection/distribution unit, and a call protocol controller. Additionally, the call protocol controller communicates with the transceiver. The base station controller module further includes an operations, administration, maintenance, and provisioning module.

In another embodiment, a method of wireless communication is provided. The method includes receiving a call from a first mobile communication device at a first wireless transceiver. The call is forwarded from the first wireless transceiver to a distributed management architecture server that includes a mobile switch center module and a base station controller module disposed within a single unit. Thereafter, the call is routed via the distributed management architecture server to a second wireless transceiver in order to communicate with respect to a second mobile communication device.

In yet another embodiment, a telephone network is provided and can include a plurality of cellular coverage sites. Each of the plurality of cellular coverage site includes a transceiver and a distributed management architecture server in direct physical connection with the transceiver. Moreover, each distributed management architecture server includes a housing. A mobile switch center module and a base station controller module are disposed within the housing. In this embodiment, each of the distributed management architecture servers within each of the plurality of cellular coverage sites is interconnected by an Internet protocol data network. Also, telephony traffic received by the transceivers is switched and routed by the distributed management architecture servers.

In still another embodiment, a distributed communication system is provided and includes a first wireless communication site and a second wireless communication site. The first wireless communication site includes a first transmission antenna, a first base station coupled to the first transmission antenna, and a first computer system including a first mobile switching system module and a first base station controller module disposed within a single unit. The second wireless communication site includes a second transmission antenna, a second base station coupled to the second transmission antenna, and a second computer system including a second mobile switching system module and a second base station controller module disposed within a single unit. In this embodiment, an Internet protocol network is coupled to the first computer system and the second computer system.

In another embodiment, a communications system is provided and includes a distributed mobile architecture server that includes a mobile switching center module and a base station controller module disposed within the same housing. The distributed mobile architecture server can be coupled to a cellular system mobile switching center, a switching transfer point of a stand-alone carrier, and a public switched telephone network. Alternatively, the distributed mobile architecture server has a first interface coupled to a base transceiver station and a second interface coupled to a data network connection.

In yet still another embodiment, a communications system is provided and includes a plurality of distributed mobile architecture servers. Each distributed mobile architecture server includes a housing. A mobile switching center module and a base station controller module are disposed within the housing. In this embodiment, the plurality of distributed mobile architecture servers are interconnected via an Internet protocol data network and one of the plurality of distributed mobile architecture servers is coupled to the public switched telephone network.

In still another embodiment, a communications system includes a distributed mobile architecture server that has a mobile switching center module and a base station controller module that are disposed within the same housing. The distributed mobile architecture server is coupled to an enterprise local area network located within a structure and a public switched telephone network outside of the structure. Also, the enterprise local area network supports a plurality of phones within the structure and is coupled to an Internet protocol network external to the structure.

In another embodiment, a communications system includes a distributed mobile architecture server includes a mobile switching center module and a base station controller module that are disposed within the same housing. Moreover, the distributed mobile architecture server is coupled to a base transceiver station and a first satellite transceiver. Alternatively, the distributed mobile architecture server is coupled to a first satellite transceiver and a data network connection.

In still another embodiment, a communications system includes a distributed mobile architecture server that has a mobile switching center module and a base station controller module that are disposed within the same housing. In this embodiment, the distributed mobile architecture server includes a primary network connection and the distributed mobile architecture server is coupled to a plurality of interworking units via a plurality of secondary network connections.

In yet another embodiment, a method of handing off calls in a wireless network is provided and includes monitoring the location of a mobile communication device at a distributed mobile architecture server that includes a mobile switching center module and a base station controller module within the same housing. Thereafter, a call made by the mobile communication device is handed off from a first base transceiver station coupled to the distributed mobile architecture server to a second base transceiver station coupled to the distributed mobile architecture server via a peer-to-peer connection.

In yet still another embodiment, a method of billing wireless telephone subscribers is provided and includes generating a call detail record for one or more subscribers at a distributed mobile architecture server that has a mobile switching center module and a base station controller module that are disposed within the same housing. One or more subscribers are billed directly from the distributed mobile architecture server.

Referring now to FIG. 1, a non-limiting exemplary embodiment of a distributive and associated telecommunications system is illustrated and is generally designated 100. As depicted in FIG. 1, the system 100 includes four cellular coverage sites 102. Each coverage site 102 includes an antenna 104. In one embodiment, the antenna 104 is connected to a transceiver belonging to a base transceiver station (BTS) and the BTS is a 3-sector BTS. FIG. 1 also indicates that a distributed mobile architecture (DMA) server 106 can be connected to each antenna 104. In one embodiment, each DMA server 106 is physically and directly connected to its respective antenna 104, e.g., by a wire or cable 108.

As illustrated in FIG. 1, each DMA server 106 is interconnected with the other DMA servers 106 via an Internet protocol network 110. As such, there exists a peer-to-peer connection 112 between each DMA server 106 in the system 100. As described in detail below, the DMA servers 106 can handle telephony traffic that is communicated at each antenna 104. For example, the DMA servers 106 can switch and route calls received via each antenna 104. Additionally, the DMA servers 106 can hand-off calls to each other as mobile communication devices move around and between the cellular coverage sites 102. The DMA servers 106 can communicate with each other via the IP network 110 and can further transmit calls to each other via the IP network 110. It should be understood that more than four cellular coverage sites 102 can be included in the system and that the inclusion of only four cellular coverage sites 102 in FIG. 1 is merely for clarity.

Within the distributed and associative telecommunications system 100 the controlling logic can be distributed and de-centralized. Moreover, the wireless coverage provided by the disclosed system 100 is self-healing and redundant. In other words, due to the interconnectivity via the IP network 110, if one or more of the DMA servers 106 loses powers, fails, or is otherwise inoperable, telephony traffic handled by the inoperable DMA server 106 can be re-routed to one of the remaining operable DMA servers 106. Additionally, user data stored in a database, e.g., a home locator resource (HLR) or a visitor locator resource (VLR), can be distributed equally and fully among all of the DMA servers 106. It can also be appreciated that new cellular coverage sites can be easily added to the system 100 as the demand for users increases. Specifically, a DMA server can be deployed as described below, connected to an antenna, connected to the IP network, and activated to provided cellular coverage in a new area.

Figure 2:
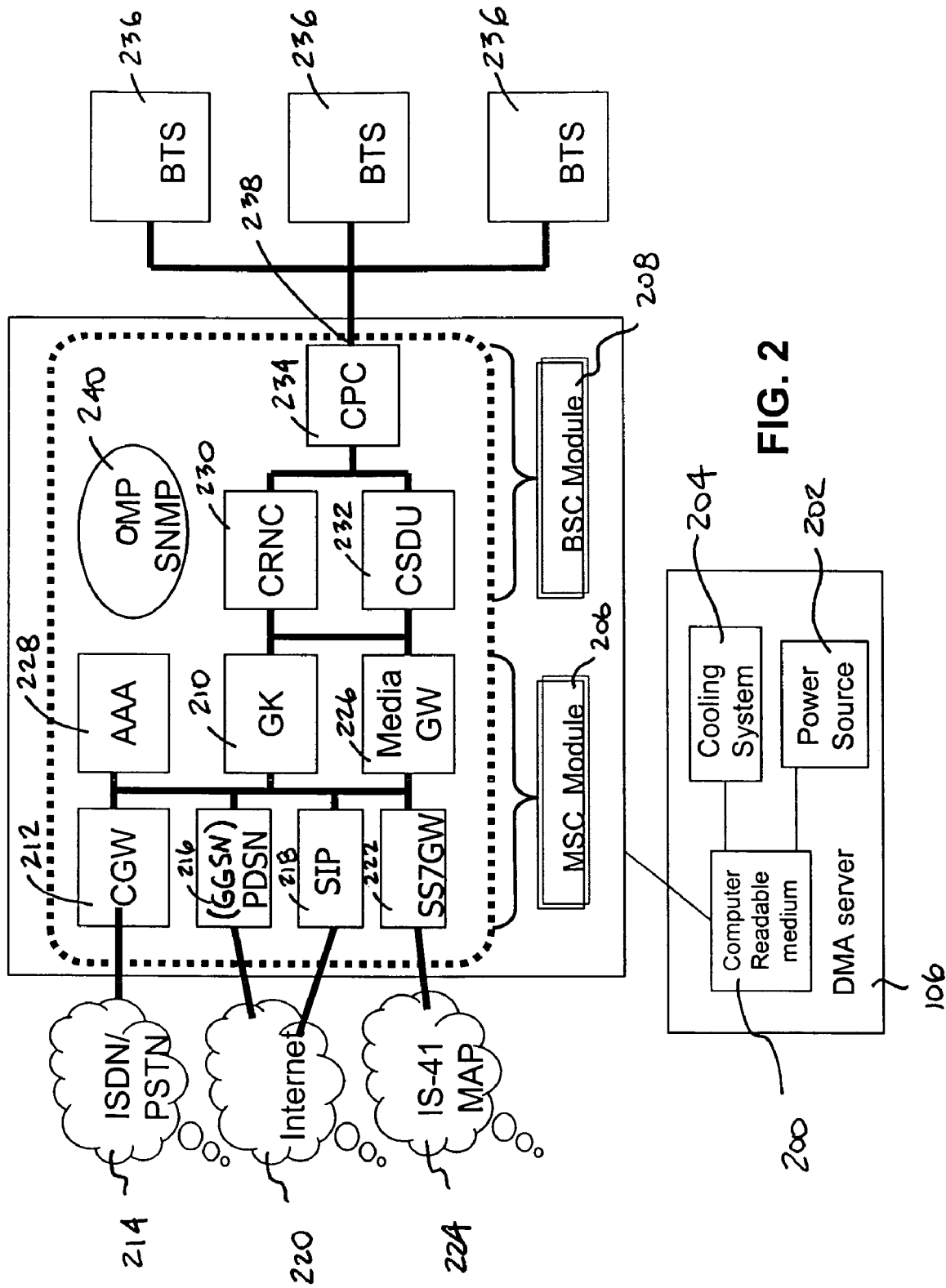
FIG. 2 is a diagram of a distributed management architecture server.

FIG. 2 shows an exemplary, non-limiting embodiment of a DMA server, e.g., one of the DMA servers 106 described in conjunction with FIG. 1. The DMA server 106 is essentially a processor, or computer, having housing and a computer readable medium 200 is disposed therein. A power supply 202 can also be disposed within the housing of the DMA server 106 in order to provide power to the DMA server 106. The power supply 202 can be a rechargeable battery disposed within the DMA server 106 or it can be external to the DMA server 106, i.e., a standard power outlet. Moreover, a cooling system 204, e.g., a fan with a thermostat, can be within the DMA server 106 included in order to keep the DMA server 106 from overheating.

As depicted in FIG. 2, the DMA server 106 can include a mobile switching center (MSC) module 206 and a base station controller (BSC) module 208 embedded within the computer readable medium 200. In an exemplary, non-limiting embodiment, the MSC module 206 can include a gatekeeper (GK) 210 that is connected to several gateways. For example, a circuit gateway (CGW) 212 can be connected to the GK 210 and can provide connectivity to an integrated services digital network/public switched telephone network (ISDN/PSTN) interface 214. The CGW 212 can provide a circuit switched to packet data conversion. In an exemplary, non-limiting embodiment, the PSTN portion of the ISDN/PSTN interface 214 can be an inter-office interface that uses the Bellcore industry standard ISDN user part (ISUP) signaling on a signaling system seven (SS7) link set. Moreover, the voice trunks on this interface can be timeslots on a T1 connection. Inbound and outbound voice calls can be supported on the ISDN portion of the ISDN/PSTN interface 214.

As further illustrated in FIG. 2, a packet data server node (PDSN) gateway 216 for CDMA or a Gateway GPRS Support Node (GGSN) for GSM and a Session Initiation Protocol (SIP) gateway 218 can also be connected to the GK 210. The PDSN gateway 216 and the SIP gateway 218 can provide connectivity to an Internet protocol (IP) interface 220. Further, the PDSN gateway 216 or a GGSN can establish a reverse tunnel with the PDSN or GGSN gateway 216 using generic routing encapsulation (GRE). Moreover, the PDSN gateway 216 or GGSN can implement the Pseudo Random Function (PRF)/Foreign Agent (FA) functionality of the DMA server 106 which supports mobile IP functions.

FIG. 2 further shows an SS7 gateway 222 that provides connectivity to an ANSI-41 and GSM MAP interface 224. In a particular embodiment, the ANSI-41 interface can be an SS7 TCAP/SCCP interface on the same SS7 link set used for ISUP signaling. The same SS7 point code can be used to identify the DMA server 106 in the ANSI-41 network. The ANSI-41 interface can be used for roamer registration only. Further, in an exemplary, non-limiting embodiment, the GSM MAP interface can be an SS7 TCAP/SCCP interface on the same SS7 link set used for ISUP signaling. It can be appreciated that there are different protocols of MAP from MAP/B to MAP/I, but in the illustrative embodiment, the different MAP/x protocols are not stacked—they are used independently.

As depicted in FIG. 2, a media gateway 226 can also be connected to the GK 210. In an exemplary, non-limiting embodiment, the media gateway 226 can include cellular transcoders, one or more intranet gateways, conferencing bridges, and group calling functionality. Further, an authentication, authorization, and accounting (AAA) module 228 can be connected to the GK 210. In an exemplary, non-limiting embodiment, there are three levels of authentication management. The highest level is for administration, the mid-level is for operations, and the lowest level is for normal users. The functions of the AAA module 228 can be included in the user level.

In an exemplary, non-limiting embodiment, the GK 210 can act as an AAA server and a feather server, which supports advanced supplementary service, short message service, etc. Moreover, the GK 210 can act as a call manager and can support ISUP and PSTN function calls. Additionally, the GK 210 can act as a signal gateway, e.g., IP to SS7 inter-working, ISUP, GSM MAP or ANSI-41 to PSTN and ANSI-42/GSM. The GK 210 can also function as a data call server.

As illustrated in FIG. 2, the BSC module 208 includes a cellular radio network controller (CRNC) 230 and a cellular selection/distribution unit (CSDU) 232 that are connected to a call protocol controller (CPC) 234. In turn, the CPC 234 can be connected to a plurality of base transceiver stations (BTSs) 236. Specifically, the DMS server 106 includes a BTS interface 238 at the CPC 234 that can be physically and directly connected to the BTSs 236. The CRNC 230 can provide cellular radio resource management and cellular call control. The CSDU 232 can provide Fundamental Channel (FCH) soft handoff section and distribution, Link Access Control (LAC) processing for inband signaling, multiplexer (MUX) functions, and centralized power control. Further, the CPC 234 can convert a T1 or E1 message or ATM interface to a data packet message. In a particular embodiment, each BTS 236 supports all signals and traffic up to the front point of the CPC 234, e.g., up to the BTS interface 238. Further, in a particular embodiment, the CRNC 230, the CPC 234, the CSDU 232 and the OMP 240 can perform one or more of the functions of legacy Base Station Controllers (BSC).

In an exemplary, non-limiting embodiment, the BTS interface 238 can be an IS-95A and IS-2000 interface over E1 or ATM, or the BTS interface 238 can be a GSM BTS interface using MAP or CAMEL. After reading this specification, skilled artisans will appreciate that the CPC 234 can be connected to one or more BTSs 236. FIG. 2 further shows that the BSC module 208 includes an operations, maintenance, and provisioning (OMP) module 240. In an exemplary, non-limiting embodiment, the OMP module 240 can use simple network management protocol (SNMP) for operations interfaces. Further, the OMP module 240 can include a JAVA user interface. The OMP module 240 can also include a software agent that is assigned to each component within the DMA server 106. The agents independently monitor their respective components. Moreover, each agent can provision its respective component.

Figure 3:
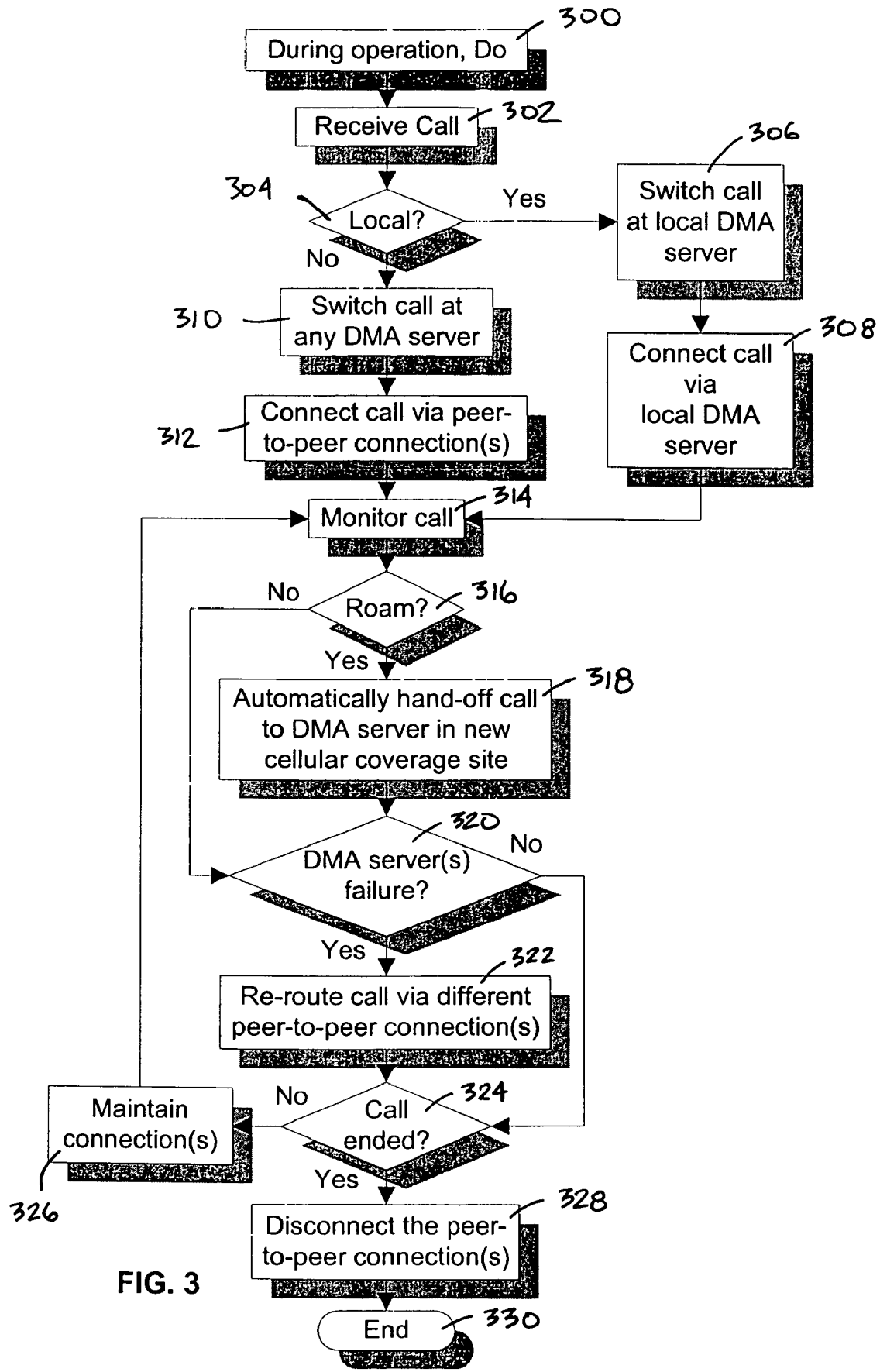
FIG. 3 is a flow chart to illustrate operating logic of a distributed management architecture server.

Referring now to FIG. 3, an exemplary, non-limiting embodiment of a flow chart is provided to illustrate operating logic of a DMA server 106 (FIG. 1). The operating logic commences at block 300 with a function loop wherein during operation, the succeeding steps are performed. At step 302, a call is received, e.g., at an antenna 104 (FIG. 1) in communication with a DMA server 106 (FIG. 1). Next, at decision step 304 it is determined whether the call is local, i.e., it is determined whether the call is between two mobile communication devices within the same cellular coverage site. If the call is local, the logic moves to block 306, and the call is switched at the local DMA server, i.e., the DMA server within the cellular coverage site in which the call is received. Then, at block 308, the call is connected from the first mobile communication device that initiated the call to a second mobile communication device via the local DMA server. Returning to decision step 304, if the call is not local, the logic proceeds to block 310 and the call is switched at the DMA server connected to the antenna 104 at which the call was received. Thereafter, at block 312, the call is connected from the first mobile communication device that initiated the call to a second mobile communication device via a peer-to-peer connection between a first DMA server and a second DMA server.

After the call is connected, either at block 308 or block 312, the logic continues to block 314 where the call is monitored. For example, the location of the first mobile communication device that initiated the call can be monitored, the location of the second mobile communication device that received the call can be monitored, the DMA server that is handling the call can be monitored, other DMA servers through which the call is connected can be monitored, and the connections (such as the peer-to-peer IP network connection) through which the call is transmitted can be monitored. Proceeding to decision step 316, it is determined if the first mobile communication device or the second mobile communication device involved in the call is roaming, i.e., moving between cellular coverage sites provided by individual antennas. If so, the logic moves to block 318 where the call at the roaming mobile communication device is automatically handed off to a new DMA server and associated antenna at a new cellular coverage site. If none of the mobile communication devices involved in the call is roaming, the logic moves to decision step 320.

At decision step 320, it is determined whether any DMA server has failed. If so, the call is re-routed around the failed DMA server by establishing one or more different peer-to-peer connections between one or more different DMA servers that are still operable. Thereafter, the logic moves to decision step 324. Decision step 324 can also be reached if it is determined that no DMA servers have failed at decision step 320. At decision step 324, it is determined whether the call has ended. If not, the logic moves to block 326 and the connection or connections through which the call has been established are maintained. Otherwise, if the call has ended, the logic moves to block 328 and the peer-to-peer connection, or connections, through which the call was established are terminated, and the logic ends, at state 330.

Figure 4:
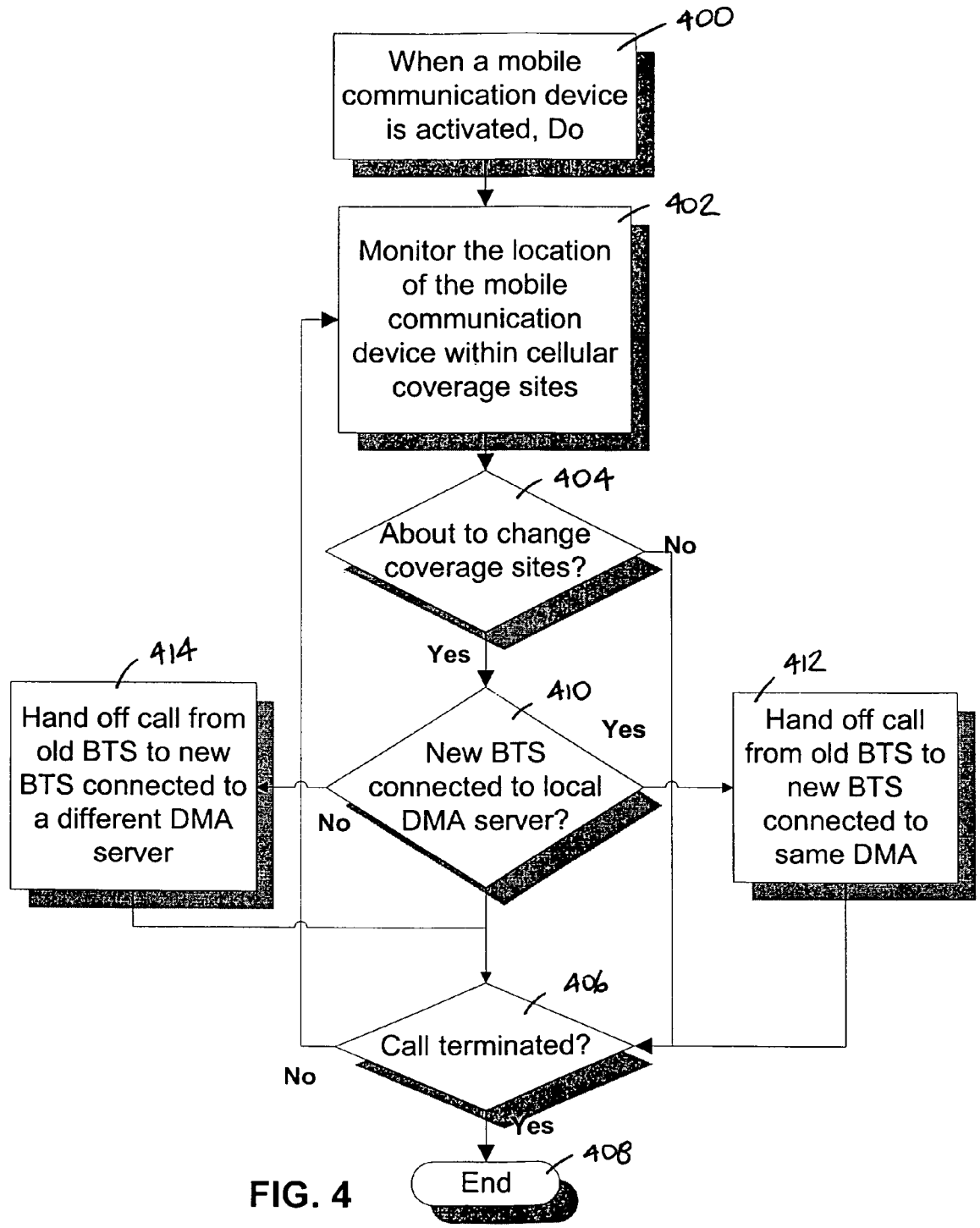
FIG. 4 is a flow chart to illustrate call hand-off logic of a distributed management architecture server.

FIG. 4 depicts a flow chart to illustrate call hand-off logic that can be performed by a DMA server 106 (FIG. 1) in order to hand off calls, or user service connections, between a first BTS and a second BTS as a mobile communication device moves between cellular coverage zones. The logic commences at block 400 with a loop wherein when a mobile communication device is activated, the following steps are performed. At block 402, the location of a mobile communication device is monitored at a local DMA server. Continuing to decision step 404, it is determined if the mobile communication device is about to move from a first cellular coverage site provided by a first BTS to a second cellular coverage site provided by a second BTS. If not, the logic moves to decision step 406 where it is determined whether the call has terminated. If the call terminates, the logic ends at state 408. On the other hand, if the call does not terminate, the logic returns to block 402 and continues as described above.

Returning to decision step 404, if the user is about to move from a first cellular coverage site provided by a first BTS to a second cellular coverage site by a second BTS, the logic proceeds to decision step 410. At decision step 410, it is determined whether the second BTS is connected locally, i.e., to the same DMS server as the first BTS. If so, the logic moves to block 412 and the DMA server hands off the call, e.g., as a soft hand off, or the user service connection, from a first BTS connected to the DMS server to a second BTS connected to the same DMS server. Conversely, if the second BTS is not local, the logic continues to block 414 where the DMS server hands off the call from a first BTS connected to the DMS server to a second BTS connected to a second DMS server. From block 412 or block 414, the logic proceeds to decision step 406 and continues as described above.

Figure 5:
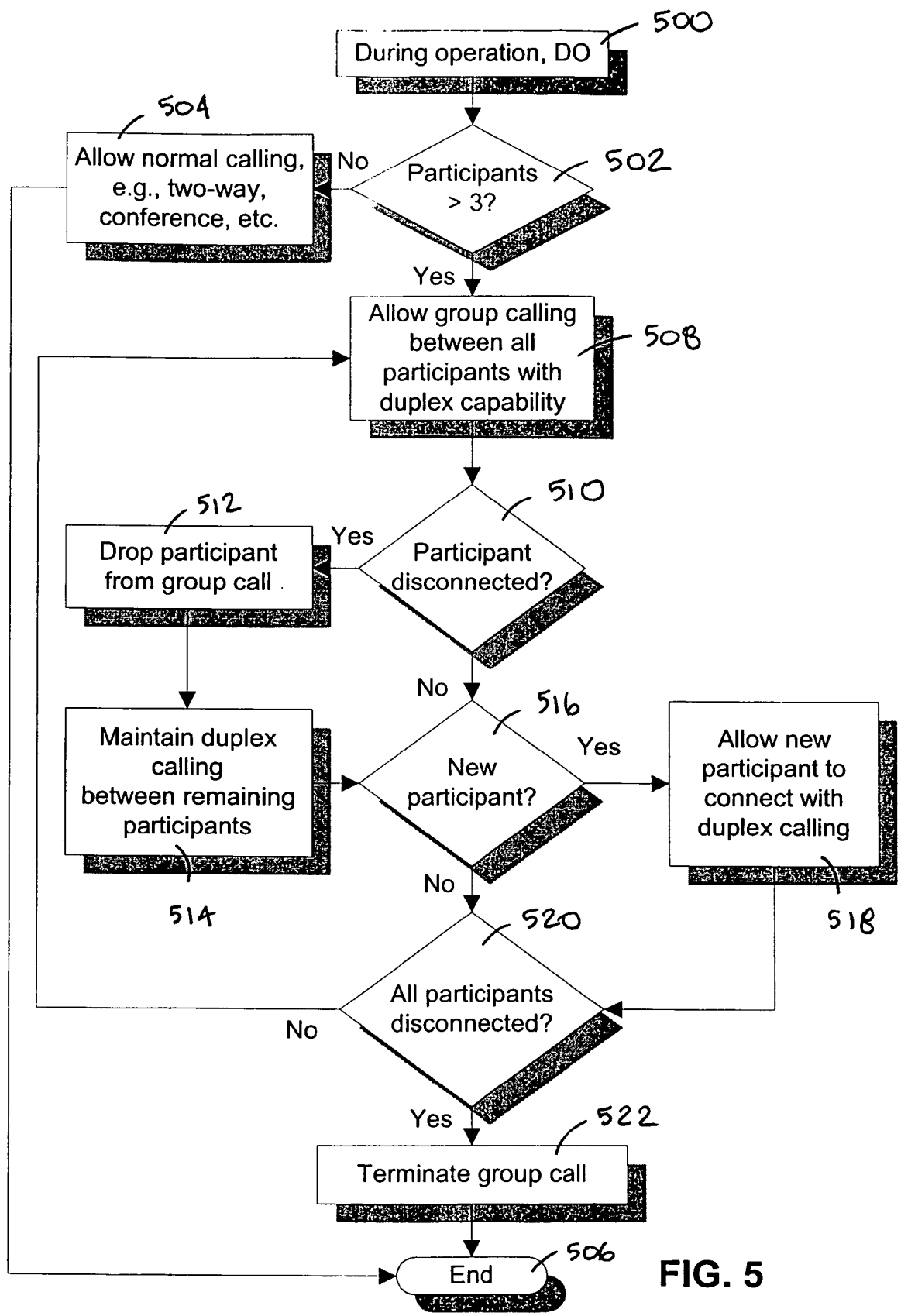
FIG. 5 is a flow chart to illustrate group call logic of a distributed management architecture server.

FIG. 5 portrays an exemplary, non-limiting embodiment of a method to illustrate group call logic that can be executed at a DMA 106 (FIG. 1) to provide a group call between several mobile communication devices and PSTN/ISDN users. At block 500, a loop is entered wherein during operation, the following steps are performed. At decision step 502, it is determined whether greater than three (3) callers are participating in a telephone call handled via one or more DMA servers 106 (FIG. 1). If not, the logic continues to block 504 and normal calling, e.g., two-way calling, three-party conference calling, etc., is allowed. The logic then ends at state 506.

At decision step 502, if greater than three (3) callers are participating in a telephone call that is handled via one or more DMA servers 106 (FIG. 1), the logic moves to block 508 and group calling is allowed between all participants with full duplex capability. Next, at decision step 510, it is determined whether one or more participants have disconnected. If so, at decision block 512, the participant or participants are dropped from the group call. At block 514, full duplex calling is maintained between the remaining group call participants. Returning to decision step 510, if no participants have disconnected, the logic proceeds to decision step 516 where it is determined whether a new participant has connected to the group call. Decision step 516 is also reached from block 514, above.

At decision step 516, if a new participant enters the group call, the new participant is allowed to connect to the group call with and may communicate with any one or more of the other participants with full duplex capability. The logic then moves to decision step 520. Decision step 520 is also reached from decision step 516 if no new participants have entered the group call. At decision step 520, it is determined whether all participants have disconnected from the group call. If not, the logic returns to block 508 and continues as described above. On the other hand, if all participants have disconnected from the group call, the logic moves to block 522 where the group call is terminated and then, ends at state 506.

Figure 6:
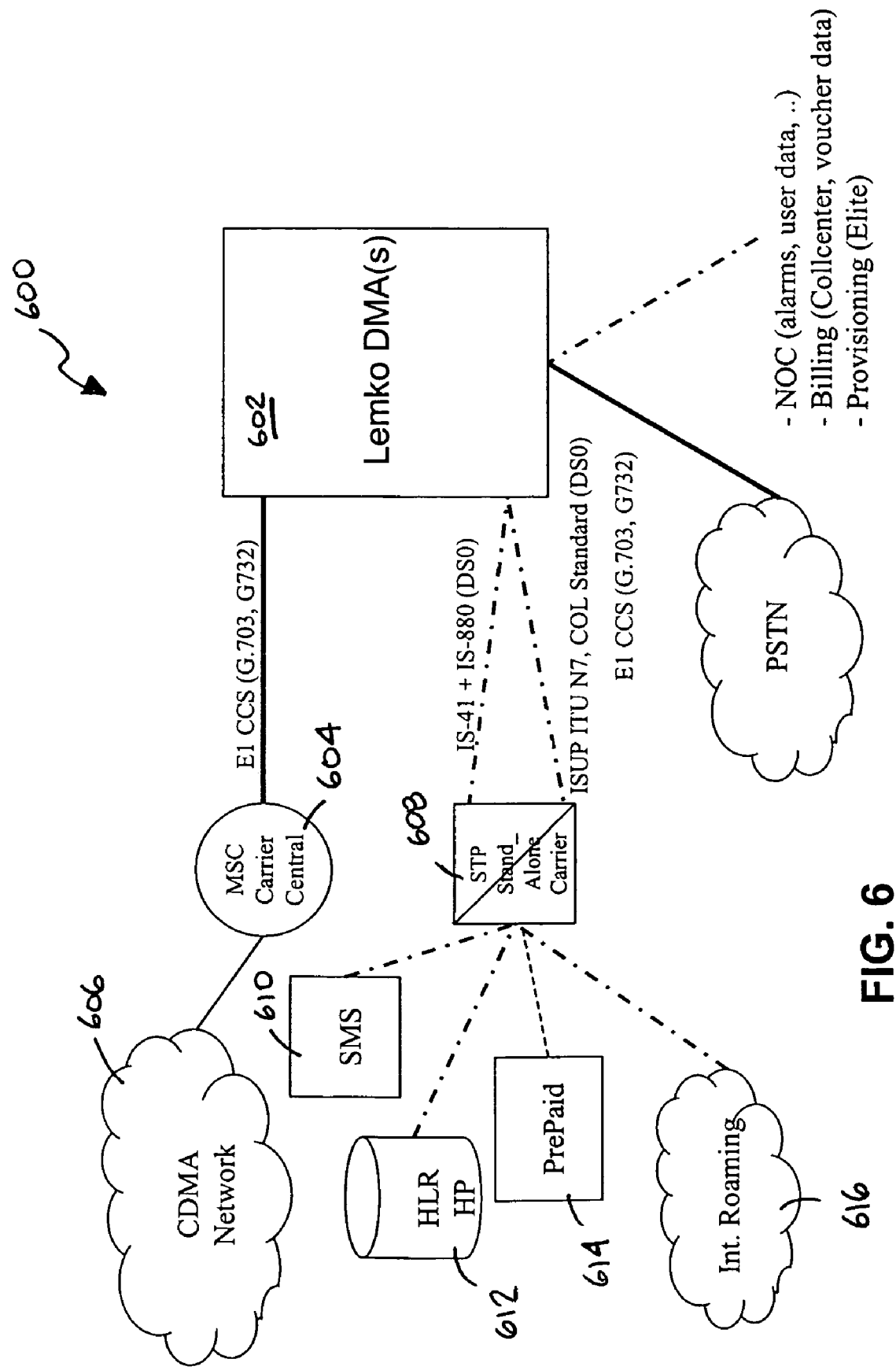
FIG. 6 is a diagram of an exemplary communication system in which a distributed management architecture server can be incorporated.

Referring now to FIG. 6, an exemplary, non-limiting embodiment of a telecommunications system is shown and is generally designated 600. As shown, the system includes one or more DMA servers 602 that are connected to a wireless carrier's central MSC 604. The DMA server(s) 602 can be connected to the MSC 604 via an E1 CCS (G.703, G732) connection, or any other applicable connection. The MSC 604, in turn, is connected to a code division multiple access (CDMA) network 606. FIG. 6 further shows that the DMA server(s) 602 can be connected to a switching transfer point (STP) 608 of a stand-alone carrier. As shown, the DMA server 602 can be connected to the STP 608 via an IS-41+IS-880 (DS0) connection, an ISUP ITU N7 connection.

As further depicted in FIG. 6, the STP 608 can be connected to a short messaging service (SMS) server 610 in order to provide text-messaging capabilities for the mobile communication devices using the system 600 shown in FIG. 6. Additionally, the STP 608 can be connected to a home location register (HLR) 612, a pre-paid wireless server 614 and an international roaming network 616 in order to provide pre-paid services and roaming between multiple countries. FIG. 6 shows that the DMA server(s) 602 can be connected to the PTSN 618 via an E1 CCS (G.703, G732) connection, or any other appropriate connection.

Figure 7:
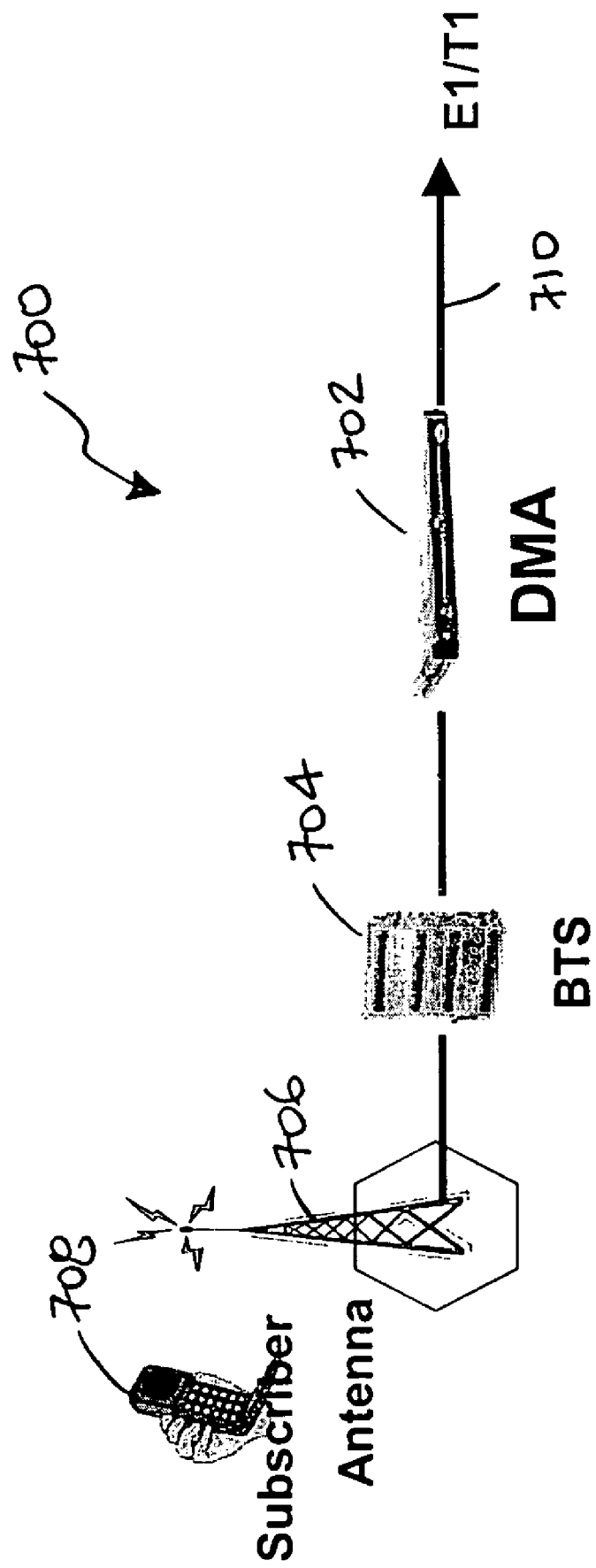
FIG. 7 is a diagram of a wireless local loop communication system in which a distributed management architecture server can be incorporated.

Referring to FIG. 7, a wireless local loop (WLL) system is portrayed and is generally designated 700. As illustrated in FIG. 7, the system 700 includes a DMA server 702 that is connected to a BTS 704. The BTS 704, in turn, is connected to an antenna 706. The antenna 706 provides cellular coverage for one or more subscribers 708 within transmission distance of the antenna 706. FIG. 7 indicates that the system 700 can further include a data network connection 710 from the DMA server 702. The data network connection 710 can connect the DMA server 702 to the PSTN via an ISUP/ISDN signaling connection on an SS7 link set or a T1/E1 wireless connection. Further, the data network connection 710 can be an IEEE 802.11 connection between the DMA server 702 depicted in FIG. 7 and other DMA servers not shown. The DMA server 702 can beneficially utilize existing infrastructure used for cellular and SMS data services.

Figure 8:
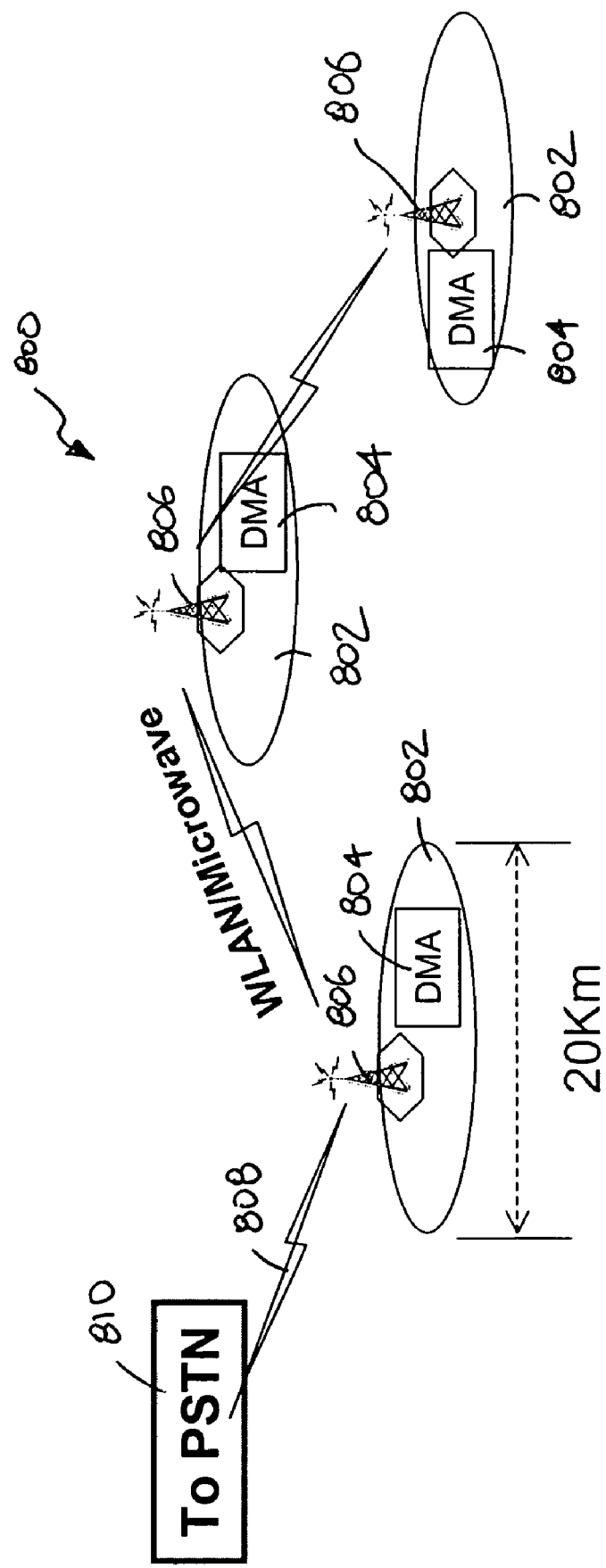
FIG. 8 is a diagram of plural wireless local loop communication systems connected to the public switched telephone network via a single back-haul connection.

FIG. 8 shows a multi-WLL system, generally designated 800. As shown, the system 800 includes a plurality of WLLs 802. Each WLL 802 can include a DMA server 804 and an antenna 806 connected thereto to provide a cellular coverage site around the antenna 806. As illustrated in FIG. 8, the WLLs 802 can be interconnected via a wireless local area network (WLAN), or a wide area network, such as a microwave connection. Moreover, a DMA server 804 within one of the WLLs 802 can provide a back-haul connection 808 to the PSTN 810. This type of deployment scenario can greatly reduce the costs associated with a wireless system. Since the DMA servers 804 are connected to each other via the WLAN or microwave connections, the relatively expensive inter-site back-haul component is removed. Further, using the hand-off logic, the DMA servers 804 can enable roaming between the WLLs 802 and can further provide roaming to an external wireless or other network.

Figure 9:
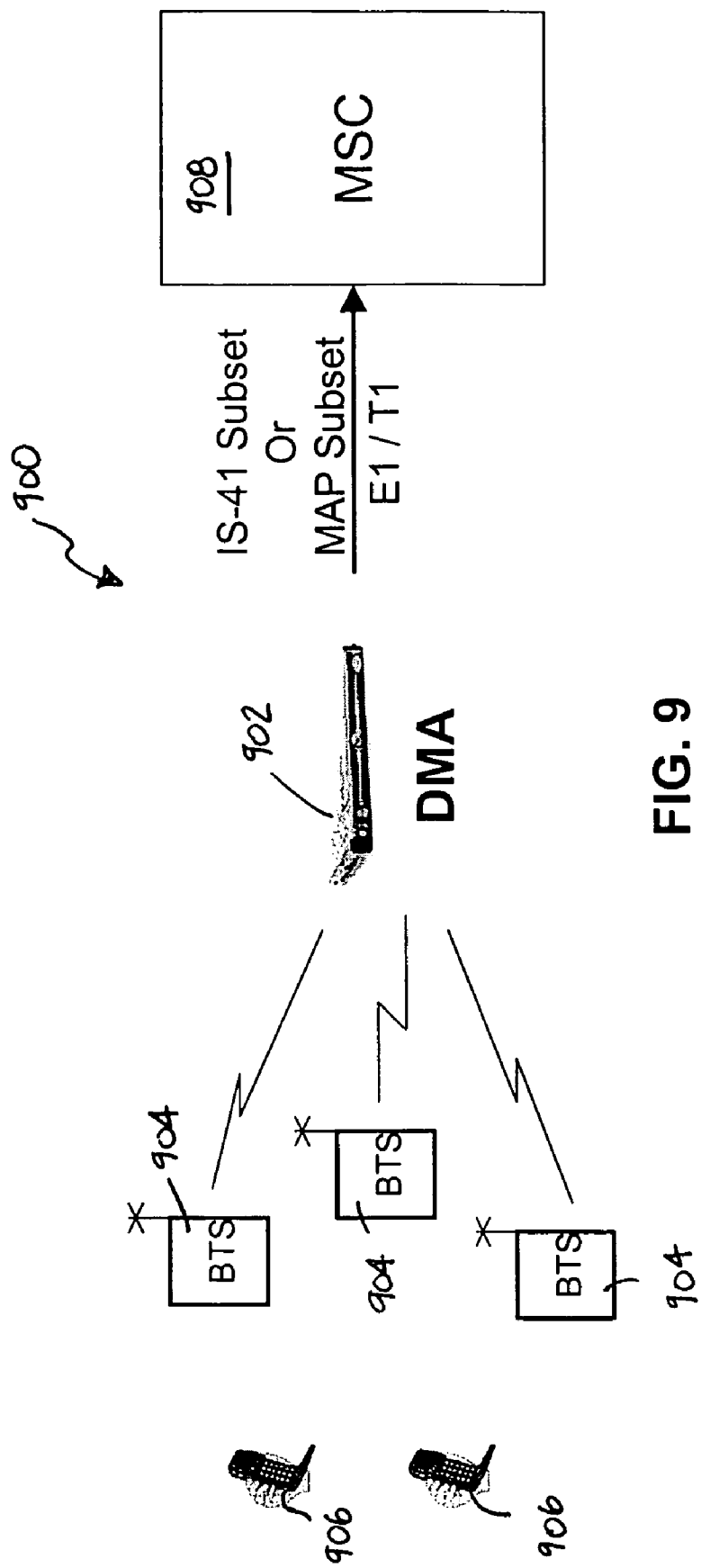
FIG. 9 is a diagram of a communication system in which a distributed management architecture server can be deployed to extend an existing cellular network.

Referring to FIG. 9, a telecommunications system is depicted and is designated 900. As illustrated in FIG. 9, the system 900 includes a DMA server 902 that can be connected to a plurality of BTSs 904. Each BTS 904 can provide cellular coverage for one or more mobile communication devices 906, e.g., one or more mobile handsets configured to communicate via the DMA server 902. FIG. 9 further shows that the DMA server 902 can be connected to an MSC 908, such as an MSC of an existing cellular system. The DMA server 902 can be connected to the MSC via an IS-41 subset or a MAP subset over a wireless E1/T1 connection. With this implementation, the DMA server 902 can extend an existing cellular network when connected to an existing cellular system MSC 908.

Figure 10:
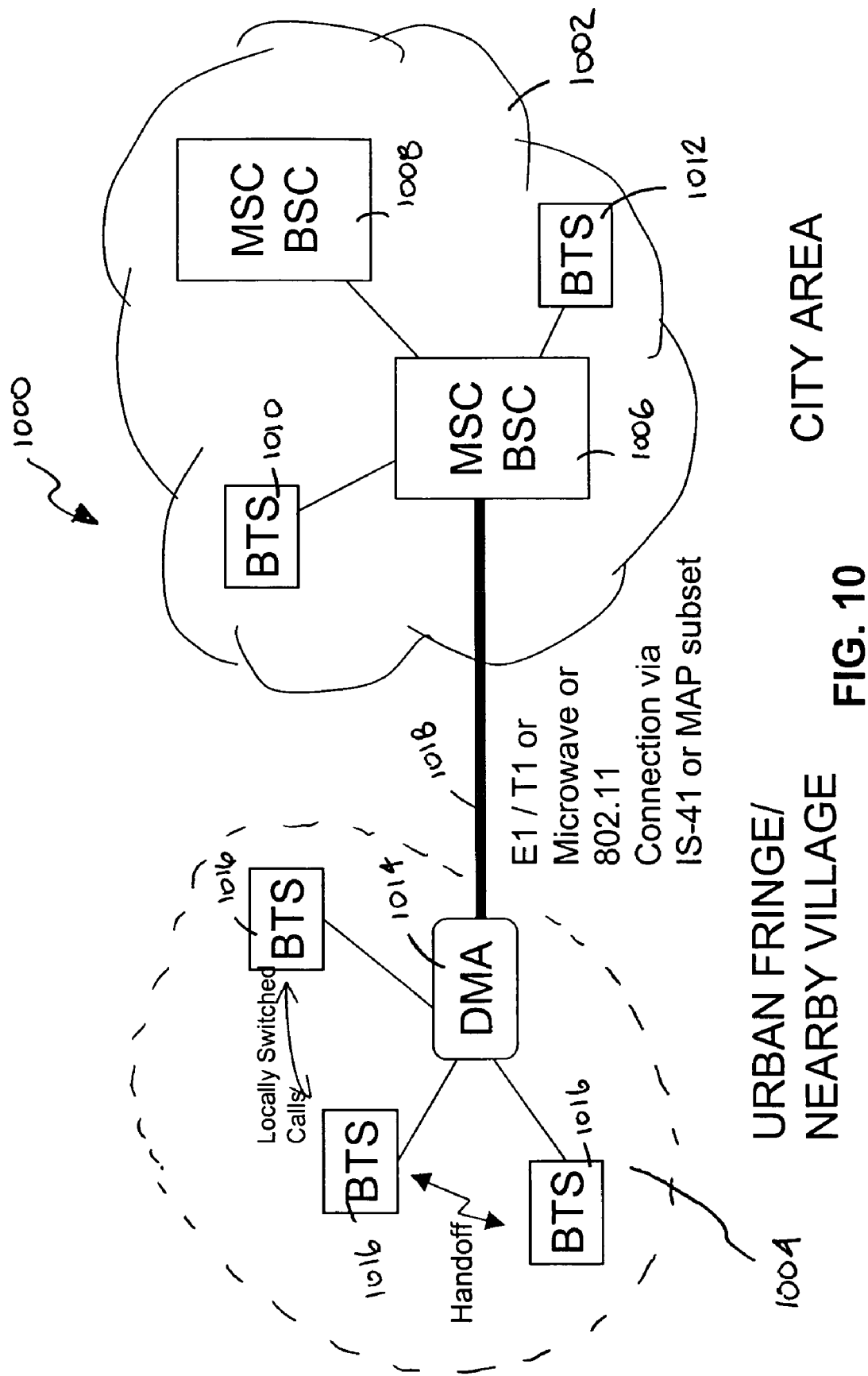
FIG. 10 is a diagram of a communication system in which a distributed management architecture server can be deployed to cover urban fringe around an existing network.

FIG. 10 shows an additional telecommunications system, generally designated 1000. As shown, the system 1000 includes a city area coverage site 1002 and an urban fringe/nearby village coverage site 1004. In an exemplary, non-limiting embodiment, the city area coverage site 1002 includes a first MSC/BSC center 1006 connected to a second MSC/BSC center 1008. Also, a first representative BTS 1010 and a second representative BTS 1012 are connected to the first MSC/BSC center 1006. The particular deployment of equipment is configured to provide adequate cellular coverage for mobile communication devices within the city area coverage site 1002.

As illustrated in FIG. 10, the urban fringe/nearby village coverage site 1004 includes a DMA server 1014 having a plurality of BTSs 1016 connected thereto. The DMA server 1014 can provide hand-off of calls between the BTSs 1016 and can switch calls made between the BTS 1016 locally. However, the DMA server 1014 within the urban fringe/nearby village coverage site 1004 can also connect telephony traffic to the first MSC/BSC center 1006 within the city area coverage site 1002 via a data network connection 1018. In one embodiment, the data network connection can be an E1 connection, a T1 connection, a microwave connection, or an 802.11 connection established via an IS-41 subset or MAP subset. The deployment of a DMA server 1014 in a location such as that described above, i.e., in urban fringe or in a nearby village, and the connection of the DMA server 1014 to an MSC/BSC center 1006 in a city area, can provide potential wireless customers that typically would not receive cellular coverage from the city area cellular coverage site 1002, can have access to wireless communication service and can further communicate with wireless customers within the city area cellular coverage site 1002.

Figure 11:
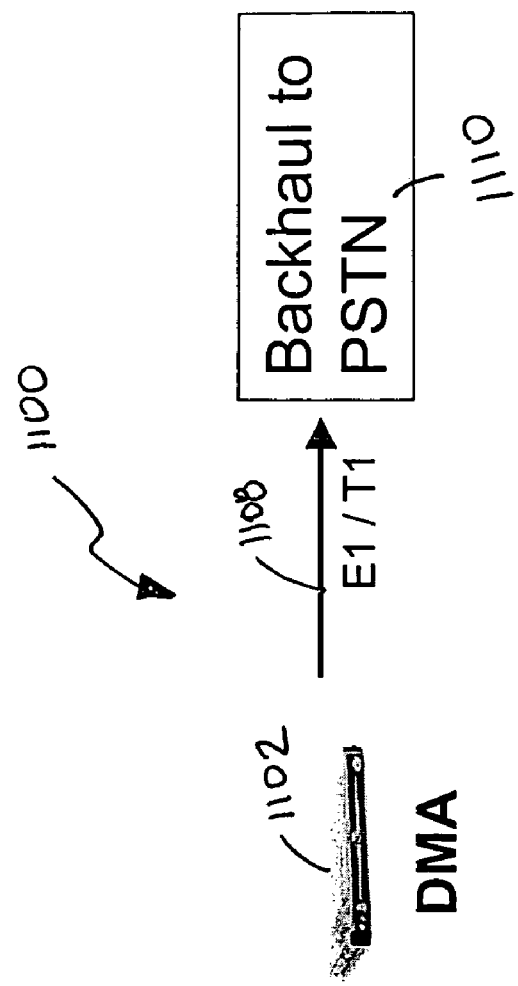
FIG. 11 is a diagram of a communication system in which a single distributed management architecture server can be connected to plural base transceiver stations and can provide a single backhaul to the public switched telephone network.
Figure 11:
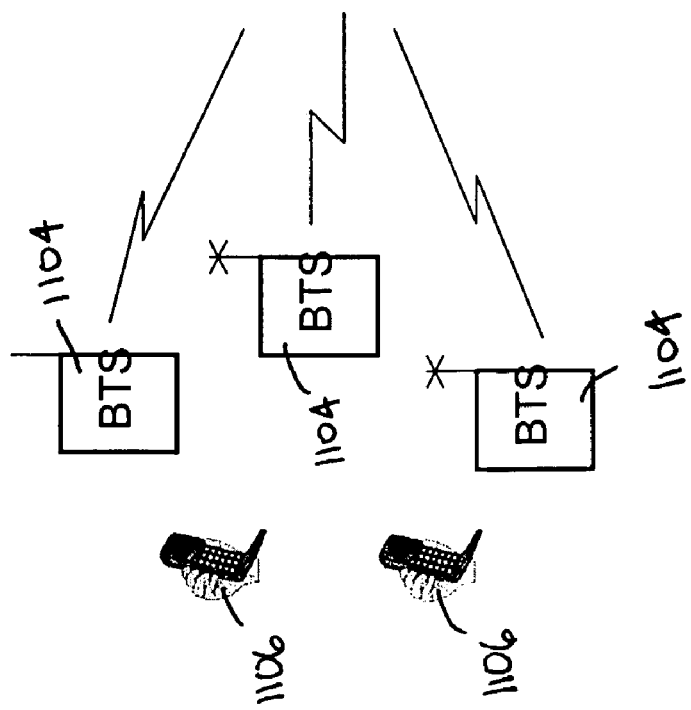

Referring now to FIG. 11, another telecommunications system is depicted and is designated 1100. As illustrated in FIG. 11, the system 1100 includes a DMA server 1102 that can be connected to a plurality of BTSs 1104. Each BTS 1104 can provide cellular coverage for one or more mobile communication devices 1106. FIG. 11 further shows that the DMA server 1102 can include a data network connection 1108 that provides a back-haul connection to the PSTN 1110. In one embodiment, the data network connection can be an E1 connection, a T1 connection, a cable connection, a microwave connection, or a satellite connection. Moreover, the system 1100 depicted in FIG. 11 can be deployed using CDMA IS-95, CDMA 1x, GSM/GPRS, W-CDMA, or other industry standard technologies.

Using a single back-haul connection greatly minimizes costs associated with the wireless communication network. Further, the system 1100 shown in FIG. 11 can be deployed relatively rapidly and can be maintained remotely. Additionally, with the inclusion of the OMP module 232 (FIG. 2) and the AAA module 222 (FIG. 2), subscriber accounts can be managed locally and billing can be performed locally, i.e., within the DMA server 1102. Moreover, as subscribers increase, the size of the system can be increased modularly, e.g., by adding DMA servers, corresponding BTSs, and the appropriate connections.

Figure 12:
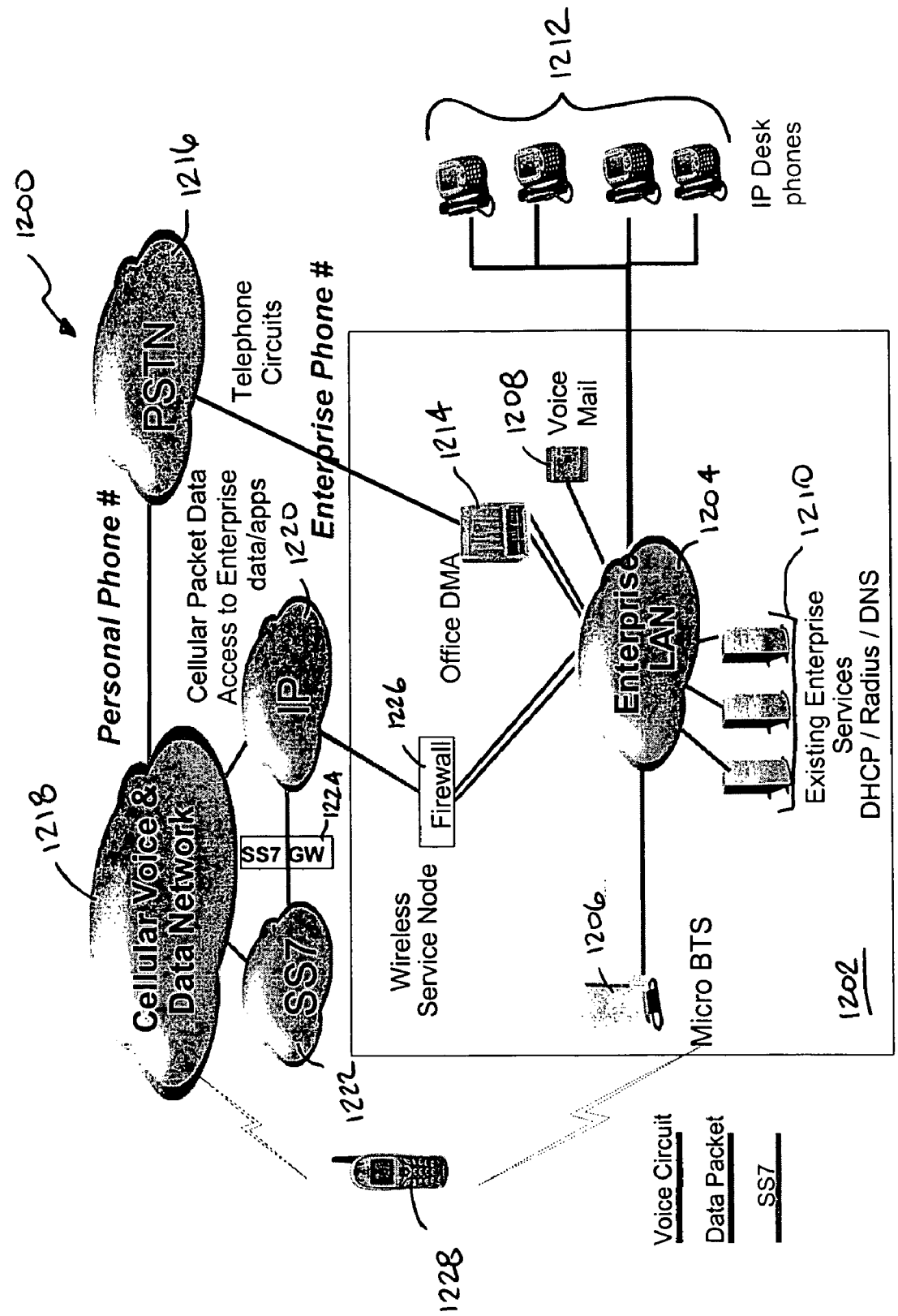
FIG. 12 is a diagram of an in-building communication system in which a distributed management architecture server can be deployed.

FIG. 12 illustrates an in-building telecommunications network that is generally designated 1200. FIG. 12 depicts a structure 1202, e.g., an office building, a commercial building, a house, etc. An enterprise local area network (LAN) 1204 is installed within the building 1202. A micro-BTS 1206 is connected to the enterprise LAN 1204. Moreover, a voice mail server 1208 and plural enterprise services servers 1210 are connected to the enterprise LAN 1204. In an exemplary, non-limiting embodiment, the enterprise services servers 1210 can include a dynamic host configuration protocol (DHCP) server, a radius server, a domain name server (DNS), etc. As depicted in FIG. 12, a plurality of phones 1212, e.g., IP desk phones, can be connected to the enterprise LAN 1204.

FIG. 12 further indicates that an office DMA server 1214 can be connected to the enterprise LAN 1204. The office DMA server 1214 can also be connected to the PSTN 1216, which, in turn, can be connected to a cellular voice and data network 1218. The enterprise LAN 1204 can also be connected to the cellular voice and data network 1218 via an Internet protocol (IP) network 1220. A signaling system seven (SS7) network 1222 can be connected to the cellular voice and data network 1218 and the IP network 1220. FIG. 12 also depicts an SS7 gateway 1224 between the SS7 network 1222 and the IP network 1220 and a firewall 1226 between the enterprise LAN 1204 and the IP network 1220. FIG. 12 shows a wireless communication device 1228 in communication with the cellular voice and data network 1218 and the micro-BTS 1206.

Figure 13:
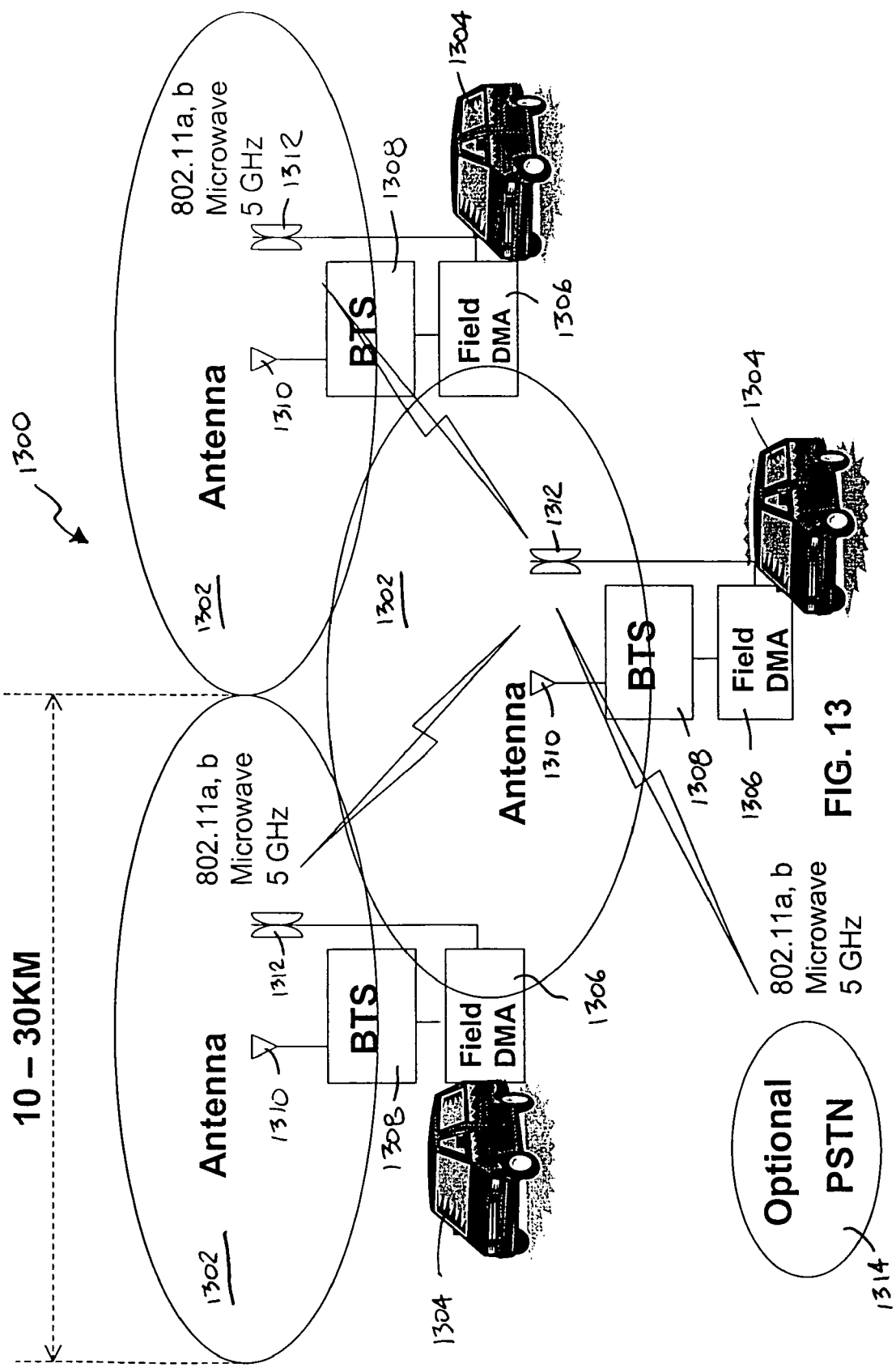
FIG. 13 is a diagram of a mobile in-field communication system in which multiple distributed management architecture servers can be deployed via multiple vehicles.

Referring now to FIG. 13, a mobile in-field telecommunications system is depicted and is generally designated 1300. As depicted, the system 1300 includes a plurality of mobile cellular coverage sites 1302. Each mobile cellular coverage site 1302 includes a vehicle 1304 in which a field DMA server 1306 is disposed. Moreover, a BTS 1308 is disposed within each vehicle 1304 and is in direct physical connection with the field DMA server 1306, e.g., by a wire or cable connected there between. The field DMA server 1306 and the BTS 1308 can be removably installed within the vehicle 1304 or permanently affixed therein. FIG. 13 further indicates that each BTS 1308 can include an antenna 1310 that is designed to communicate with mobile communication devices. Also, each field DMA server 1306 includes an antenna 1312. In an exemplary, non-limiting embodiment, the field DMA servers 1306 can communicate wirelessly with each other via the antennae 1312, e.g., via 802.11a, 802.11b, microwaves, or other wireless link.

The mobile cellular coverage sites 1302 can be deployed to provide a temporary web of cellular coverage for a plurality of mobile communication devices, e.g., devices carried by solders during a battle. The mobile in-field communications system 1300 can be recalled, moved, and re-deployed as necessary. Further, the system can include a wireless connection, e.g., 802.11a, 802.11b, microwaves, to the PSTN 1314.

Figure 14:
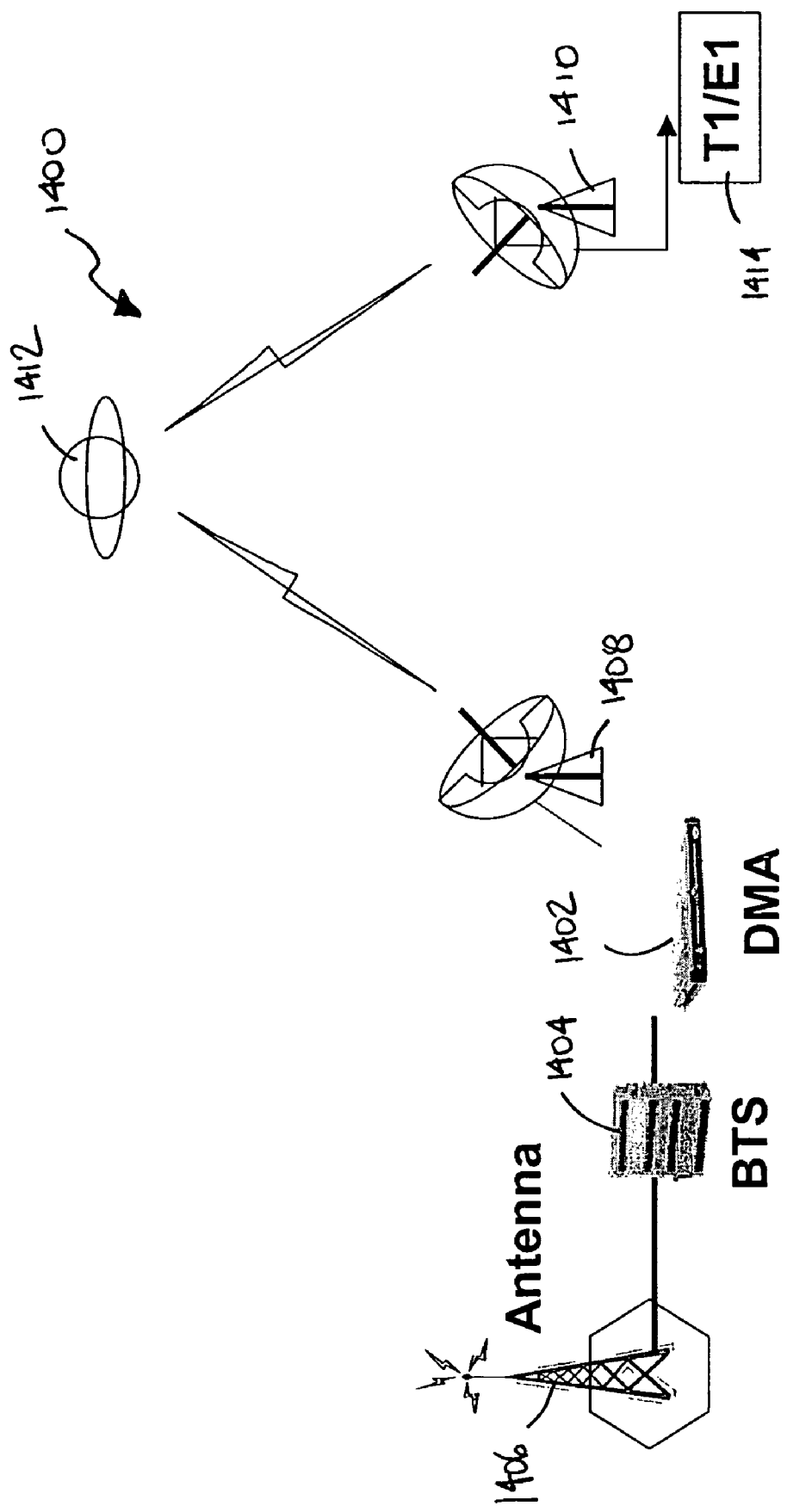
FIG. 14 is a diagram of a communication system in which a distributed management architecture server can utilize a satellite connection as a backhaul connection.

Referring to FIG. 14, still another telecommunications system is illustrated and is generally designated 1400. As depicted in FIG. 14, the system 1400 includes a DMA server 1402 that is connected to a BTS 1404. The BTS 1404, in turn, is connected to an antenna 1406. FIG. 14 further illustrates that a first satellite transceiver 1408 is also connected to the DMA server 1402. The first satellite transceiver 1408 communicates with a second satellite transceiver 1410 via a satellite 1412. Additionally, the second satellite transceiver 1410 includes a data network connection 1414, e.g., a T1 connection, or an E1 connection. The satellite transceivers 1408, 1410 and the satellite 1412 can provide a backhaul connection for the DMA server 1402. Or, the satellite transceivers 1408, 1410 and the satellite 1412 can connect the DMA server 1402 to an additional DMA server (not shown).

Figure 15:
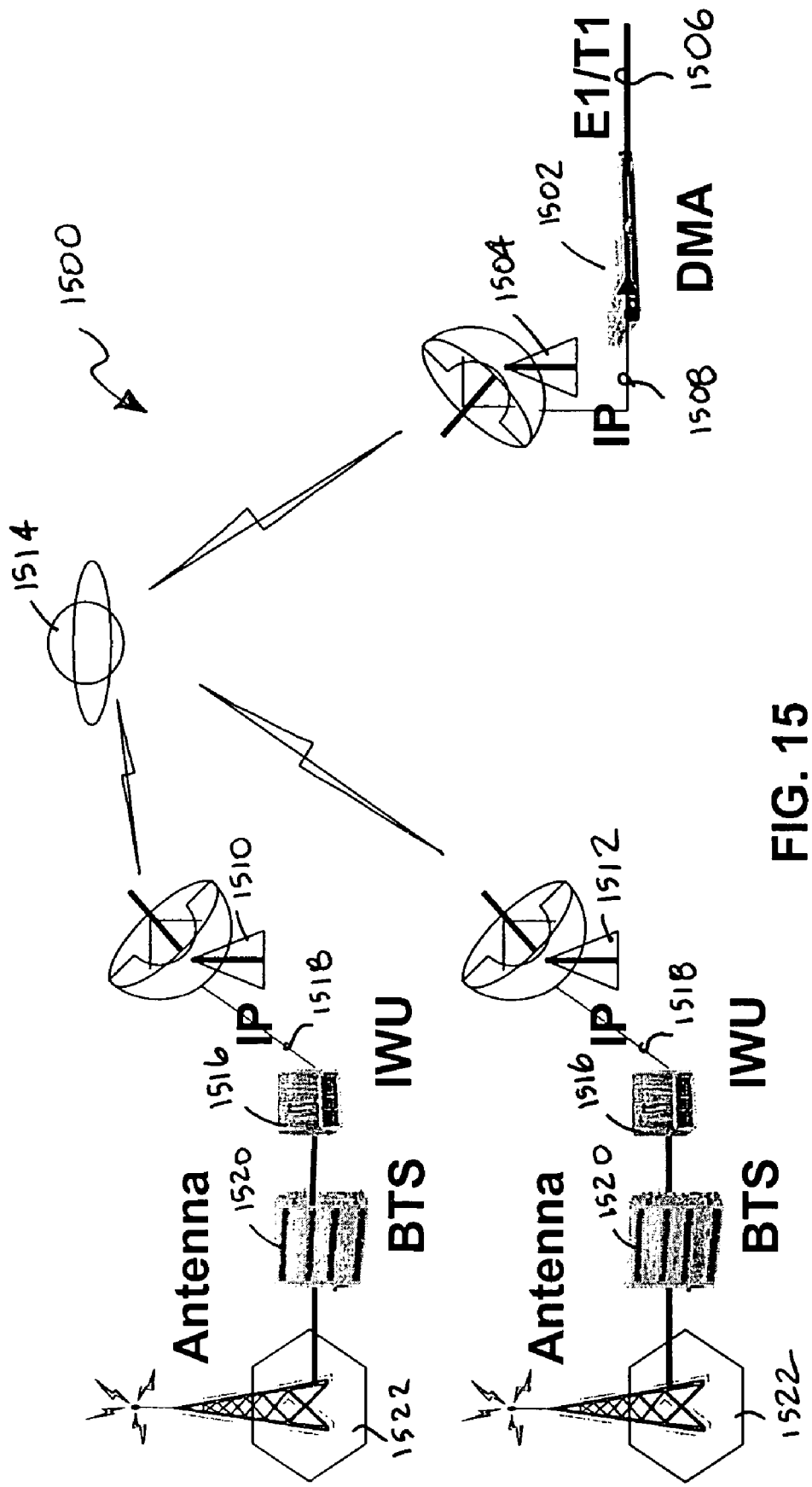
FIG. 15 is a diagram of a communication system in which a distributed management architecture server can receive multiple backhaul signals via multiple satellite signals.

FIG. 15 shows yet another telecommunications system that is generally designated 1500. As illustrated in FIG. 15, the system includes a DMA 1502 that is connected to a first satellite transceiver 1504. Moreover, the DMA 1502 includes a primary network connection 1506, e.g., a T1 connection, or an E1 connection, and a secondary network connection 1508, e.g., an IP connection. FIG. 15 shows that the first satellite transceiver 1504 communicates with a second satellite transceiver 1510 and a third satellite transceiver 1512 via a satellite 1514. Each of the second and third satellite transceivers 1510, 1512 is connected to an interworking unit (IWU) 1516 via a data network connection 1518, e.g., an IP connection. Each IWU 1516 is connected to a BTS 1520, which in turn, is connected to an antenna 1522. The satellite transceivers 1504, 1510, 1512 provide an IP network extension for the DMA server 1502. Moreover, in the deployment illustrated in FIG. 15, the DMA server 1502 can act as a centralized micro-switch for handling calls received at the antennas 1522 and transmitted via the second and third satellite transceivers 1510, 1512.

Figure 16:
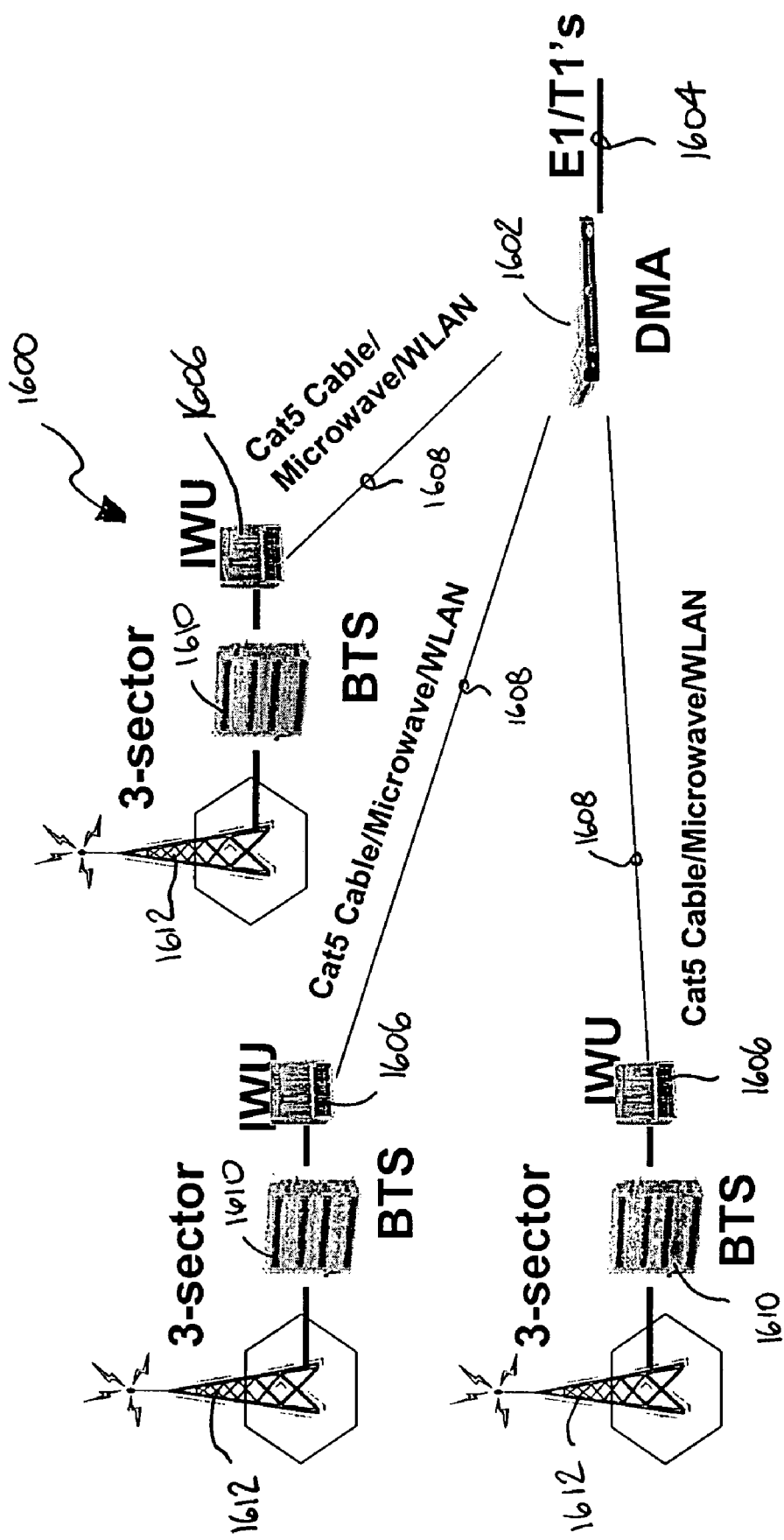
FIG. 16 is a diagram of a communication system in which a single distributed management architecture server can be connected to multiple base transceiver stations.

Referring now to FIG. 16, another telecommunications system is depicted and is designated 1600. As shown, the system 1600 includes a DMA server 1602 having a primary network connection 1604. Moreover, the DMA server 1602 can be connected to a plurality of IWUs 1606. In an exemplary, non-limiting embodiment, the DMA server 1602 can be connected to each IWU 1606 via a secondary network connection 1608, such as a category five (Cat 5) cable connection, a microwave connection, or a WLAN connection. Further, each IWU 1606 is connected to a BTS 1610 and each BTS 1610, in turn, is connected to an antenna 1612. Each BTS 1610 can be a 3-sector BTS. In the deployment depicted in FIG. 16, the DMA server 1602 can act as a centralized micro-switch that can be used to handle telephony traffic received at the antennae 1612.

With the configuration of structure described above, the present disclosure provides a flexible telecommunications device, i.e., the DMA server 106 (FIG. 1), that is distributive and associative, i.e., it can operate stand-alone or seamlessly within an existing cellular network. Moreover, the DMA server 106 can be integrated with virtually any third party base station. The DMA server 106 can operate with any air interface including CDMA IS-95, CDMA 1x, CDMA EVDO, GSM, GPRS, W-CDMA, 802.11 (Wi-fi), 802.16 (Wi-fi), etc. Further, the DMA server 106 can provide integrated prepaid billing, OAMP, network management, and AAA functionality. The DMA server 106 can include a Java based user interface and feature configuration system. Also, the DMA server 106 can provide real time call metering, call detail record (CDR) generation, and real time call provisioning. The DMA server 106 may be implemented in a relatively small footprint and a relatively low power requirement. Further, the DMA server 106 may be implemented using inexpensive and widely available computer equipment.

With one or more of the deployment configurations described above, the present system provides mobile to landline calls from mobile handsets within a DMA server cellular coverage area. Also, mobile to landline calls can be made from mobile handsets roaming into DMA coverage areas. Mobile to mobile calls can be made from home/roaming handsets to DMA handsets and vice versa. Further, mobile to IP calls and IP to mobile calls can be made from within a DMA server coverage area. IP to IP calls can be made from any DMA handset to any IP phone. Additionally, IP to landline calls and landline to IP calls can be made from a DMA handset to any phone. And, land to mobile calls to DMA handsets can be made.

The systems described above can support call forwarding, call waiting, 3-way calling caller ID, voice mail, and mobile to mobile SMS service, i.e., text messaging. Further, the systems described above can provide broadcast SMS service, mobile to land high-speed IP data (1x or GPRS) service and mobile-to-mobile high speed IP data (1x or GPRS) service. Also, the systems described above can provide IP-PBX capability.

Further, one or more of the illustrated systems can provide IP transport between distributed elements, e.g., DMA servers 106 (FIG. 1). Packet back-haul from BTS to RAN can be provided. Further, the control logic within the DMA servers 106 (FIG. 1) can be distributed and associated. Associated systems can be redundant, self-healing, self-organizing, and scalable. Distributed systems can be "snap-together," i.e., a DMA server 106 (FIG. 1) can be linked to a previously deployed DMA server 106 (FIG. 1) in order to broaden, or otherwise extend, cellular coverage. Further, distributed systems can be de-centralized to avoid single points of failure.

One or more of the systems described above can also provide soft and softer call handoffs on the same frequency interfaces. Also, soft handoffs can be provided on different systems. Further, a DMA based system can operate stand-alone with a billing system provided by a DMA server and CDR generation. Or, a system can use the SS7 network to pass CDRs to a central switch for integrated billing and operation with an existing network.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A communications system comprising:
    a first distributed mobile architecture server, comprising:
        a first computer readable medium;
        a first mobile switching center module embedded in the first computer readable medium, wherein the first mobile switching center module includes a first authentication, authorization, and accounting (AAA) module, the first AAA module configured to support generation of first call detail records at the first distributed mobile architecture server; and
        a first base station controller module embedded in the first computer readable medium;
        wherein the first distributed mobile architecture server is in direct physical connection with a first wireless transceiver; and
    a second distributed mobile architecture server, comprising:
        a second computer readable medium;
        a second mobile switching center module embedded in the second computer readable medium, wherein the second mobile switching center module includes a second AAA module, the second AAA module configured to support generation of second call detail records at the second distributed mobile architecture server; and
        a second base station controller module embedded in the second computer readable medium;
        wherein the second distributed mobile architecture server is in direct physical connection with a second wireless transceiver;
    wherein telephony traffic received at the first wireless transceiver of the first distributed mobile architecture server is transmitted from the first distributed mobile architecture server to the second distributed mobile architecture server via a peer-to-peer connection.

2. The communications system of claim 1, wherein traffic received at the first wireless transceiver of the first distributed mobile architecture server is transmitted from the first distributed mobile architecture server to the second distributed mobile architecture server via the peer-to-peer connection while the first distributed mobile architecture server moves from a first location to a second location.

3. The communications system of claim 2, wherein traffic received at the first wireless transceiver of the first distributed mobile architecture server is transmitted from the first distributed mobile architecture server to the second distributed mobile architecture server via the peer-to-peer connection while the second distributed mobile architecture server moves from a third location to a fourth location.

4. The communications system of claim 3, wherein the first distributed mobile architecture server includes administrative information corresponding to one or more wireless telephone device subscribers stored on the first computer readable medium.

5. The communications system of claim 4, wherein the first distributed mobile architecture server further comprises a gateway to a public switched telephone network.

6. The communications system of claim 5, wherein the first distributed mobile architecture server further comprises a media gateway.

7. The communications system of claim 6, wherein the first distributed mobile architecture server further comprises one of a packet data serving node (PDSN) gateway and a Gateway GPRS Support Node (GGSN).

8. The communications system of claim 7, wherein the first mobile switching center module further comprises a simple Internet phone gateway.

9. The communications system of claim 8, wherein the first mobile switching center module further comprises a signaling system seven (SS7) gateway.

10. The communications system of claim 9, wherein the first mobile switching center module further comprises a gatekeeper module coupled to the public switched telephone network gateway, the media gateway, the PDSN gateway or the GGSN, a Session Initiation Protocol gateway, and the first AAA module.

11. The communications system of claim 1, wherein the first base station controller module comprises a cellular radio network controller.

12. The communications system of claim 11, wherein the first base station controller module further comprises a cellular selection/distribution unit.

13. The communications system of claim 12, wherein the first base station controller module comprises a call protocol controller.

14. The communications system of claim 13, wherein the call protocol controller communicates with the first wireless transceiver.

15. The communications system of claim 14, wherein the first base station controller module comprises an operations, maintenance, and provisioning (OMP) module.

* * * * *